United States Patent
Ivansson et al.

(10) Patent No.: US 7,818,118 B2
(45) Date of Patent: Oct. 19, 2010

(54) METHOD FOR PLANNING THE VELOCITY OF A CRAFT ALONG A ROUTE

(75) Inventors: Johan Ivansson, Linköping (SE); Måns Mångård, Paris (FR)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 11/535,503

(22) Filed: Sep. 27, 2006

(65) Prior Publication Data

US 2007/0078573 A1    Apr. 5, 2007

(30) Foreign Application Priority Data

Sep. 30, 2005  (EP)  .................. 05109113

(51) Int. Cl.
 *G01C 21/00* (2006.01)
 *G01P 15/00* (2006.01)
 *G06F 19/00* (2006.01)
 *G06G 7/70* (2006.01)
 *G06G 7/76* (2006.01)

(52) U.S. Cl. .................. 701/202; 701/121; 701/3; 701/201; 73/488

(58) Field of Classification Search ............. 244/191; 340/961, 971; 342/109, 29, 36; 701/121, 701/204, 7; 73/488
See application file for complete search history.

(56) References Cited

U.S. PATENT DOCUMENTS

| | | | | | |
|---|---|---|---|---|---|
| 4,774,670 | A | * | 9/1988 | Palmieri | 701/204 |
| 5,051,910 | A | * | 9/1991 | Liden | 701/204 |
| 5,121,325 | A | * | 6/1992 | DeJonge | 701/123 |
| 5,408,413 | A | * | 4/1995 | Gonser et al. | 701/204 |
| 5,457,634 | A | * | 10/1995 | Chakravarty | 701/3 |
| 5,842,142 | A | * | 11/1998 | Murray et al. | 701/16 |
| 6,507,782 | B1 | * | 1/2003 | Rumbo et al. | 701/121 |
| 6,828,922 | B1 | * | 12/2004 | Gremmert et al. | 340/949 |
| 7,248,952 | B2 | * | 7/2007 | Ma et al. | 701/25 |
| 7,272,491 | B1 | * | 9/2007 | Berard | 701/202 |
| 7,283,895 | B2 | * | 10/2007 | Bouchet | 701/3 |
| 2003/0093219 | A1 | * | 5/2003 | Schultz et al. | 701/202 |
| 2006/0224318 | A1 | * | 10/2006 | Wilson et al. | 701/213 |

* cited by examiner

*Primary Examiner*—Khoi Tran
*Assistant Examiner*—Nicholas Kiswanto
(74) *Attorney, Agent, or Firm*—Venable LLP; Eric J. Franklin

(57) ABSTRACT

A method for planning the velocity of a craft along a predetermined route, where said method comprises the step of transforming demands and limitations of said route and said craft into a time-distance domain. Said planning subsequently takes place in said domain. The method saves computational time.

11 Claims, 10 Drawing Sheets

METHOD FOR PLANNING THE VELOCITY OF A CRAFT ALONG A ROUTE

FIELD OF THE INVENTION

The present invention refers to a method and a system for planning the velocity of a vehicle along a predetermined route.

BACKGROUND

Mission planning is an important activity both for manned and unmanned crafts. Such planning provides a means for increasing the safety of a mission and also provides for keeping a time schedule. Mission planning is a process shortly described as the activity needed to find a route between two waypoints.

A number of constraints may be imposed on the route. For example, said route shall avoid static and dynamic threats or crafts, minimize fuel consumption, keep within predetermined spatial limits regarding flight level and position, arrive at the target at a certain point in time, having a certain velocity and a certain course. The route must also be such that the craft can travel along said route taking the physical properties of said craft into consideration regarding performance in velocity, acceleration and manoeuvrability.

It is possible to use pure analysis to describe target and constraints as a huge optimization problem, and subsequently apply techniques capable of finding a route that solves the problem. In reality this is difficult, since it would require large amounts of computational power to solve a realistic problem.

State of the art techniques include dividing the problem into several steps, which makes it possible to plan in "real time". First, the route is planned, regardless of velocity, and subsequently the velocity is planned along the determined route.

PRIOR ART

In U.S. Pat. No. 6,061,612 an aircraft flight management system is disclosed, comprising a process for managing air speed of an aircraft in flight. The method includes a first step of determining a point on the flight path at which it is theoretically possible to comply with a required time constraint by following a pre-established speed profile. In a second step, a speed is computed and a fresh speed profile is determined. This is obtained by determining speed corrections segment-by-segment from the point up to the last modifiable segment. The speed change in each segment is restricted to a maximum value. The new speed is computed on the basis of the curve showing the flight time t as a function of the speed V. This curve is approximated by a curve satisfying an equation with three coefficients ($C_1$, $C_2$, $C_3$):

$$V=C_1/t+C_2/t^2+C_3t^3$$

Compliance with time constraints are ensured by this method while meeting the requirements of the pilot and air traffic controllers.

U.S. Pat. No. 4,774,670 also describes a flight management system, comprising a system capable of accepting flight data information, including a required time of arrival.

U.S. Pat. No. 6,507,782 discloses an aircraft control system for reaching a waypoint at a required time of arrival.

U.S. Pat. No. 5,408,413 discloses an apparatus and a method for controlling an optimizing aircraft performance calculation to achieve time constrained navigation.

U.S. Pat. No. 5,121,325 discloses a required time of arrival control system.

U.S. Pat. No. 6,266,610 discloses a multi-dimensional route optimizer.

SUMMARY OF THE INVENTION

The problem of planning the velocity, or the velocities, along an already planned distance is relatively straight forward to solve, calculating the mean velocity along the distance. The problem becomes more complex when it is necessary to take into consideration other moveable objects and other restrictions as well as boundary values. These requirements and limitations include:

Moving (dynamic) threats and objects crossing the planned route shall as far as possible be avoided.

The velocities in the beginning and the end of the route, specified by the mission, and the time or time-window when the craft is to pass the end point of the route.

The performance of the craft, including maximum and minimum velocity, acceleration and deceleration.

The shape of the route in respect of the turning performance of the craft, i.e. an estimated maximum velocity along a certain part of a distance, e.g. a sharp turn, such that the craft is able to follow the route within a certain error.

The object of the invention is to provide a general method for solving the above mentioned problem, such that an allowed velocity, satisfying the conditions, can be calculated for the planned route. There seems to be no existing solution, managing the restrictions mentioned above in a simple manner. The present invention solves the above-mentioned problem by handling the restrictions of the problem in a way such that the problem can be transformed. When the problem has been transformed, conventional methods can be used to solve it. The invention provides a method for planning the velocity of a craft along a predetermined route, comprising the following steps:

Obtaining data representative of mission demands.

Obtaining data representative of dynamic limitations of the craft.

Obtaining data representative of a predetermined route.

Obtaining data representative of a dynamic situation picture.

Transforming said mission demand data, dynamic limitation data, route data and dynamic situation data into the time-distance domain.

Creating a distance envelope in said time-distance domain.

Determining a distance profile in the time-distance domain which conform to the obtained data and stays within the distance envelope.

Determining a velocity profile from the time derivative of the distance profile.

In said method the step of creating a distance envelope comprises creating an upper limitation curve, and creating a lower limitation curve.

Creating an upper limitation curve comprises the step of creating a time-distance curve, or an equivalent of such a curve, corresponding to a case where the craft initially travels at maximum speed and switches to minimum speed at the latest moment to arrive at a finish point at an earliest permitted arrival time. Creating a lower limitation curve comprises the step of creating a time distance curve, or an equivalent of such a curve, corresponding to a case where the craft initially travels at minimum speed and at the latest moment switches to maximum speed to arrive at a finish point at a latest permitted arrival time.

The above mentioned dynamic situation data comprises data on objects intersecting the predetermined route, including course and estimated velocity and velocity variations and/or uncertainty.

The above method can also comprise the step of creating a threat envelope.

Said step of determining of a distance profile includes the step of creating a time-distance curve, representative of said distance profile, that does not cross the area defined by the threat envelope.

Said threat envelope is created by creating an upper (520) and a lower (530) limitation curve for the threat object in a similar manner as described for the craft above.

The invention also provides a system for performing planning according to the method, and a corresponding computer software product.

DETAILED DESCRIPTION OF PREFERRED EMBODIMENTS

Figure 1:
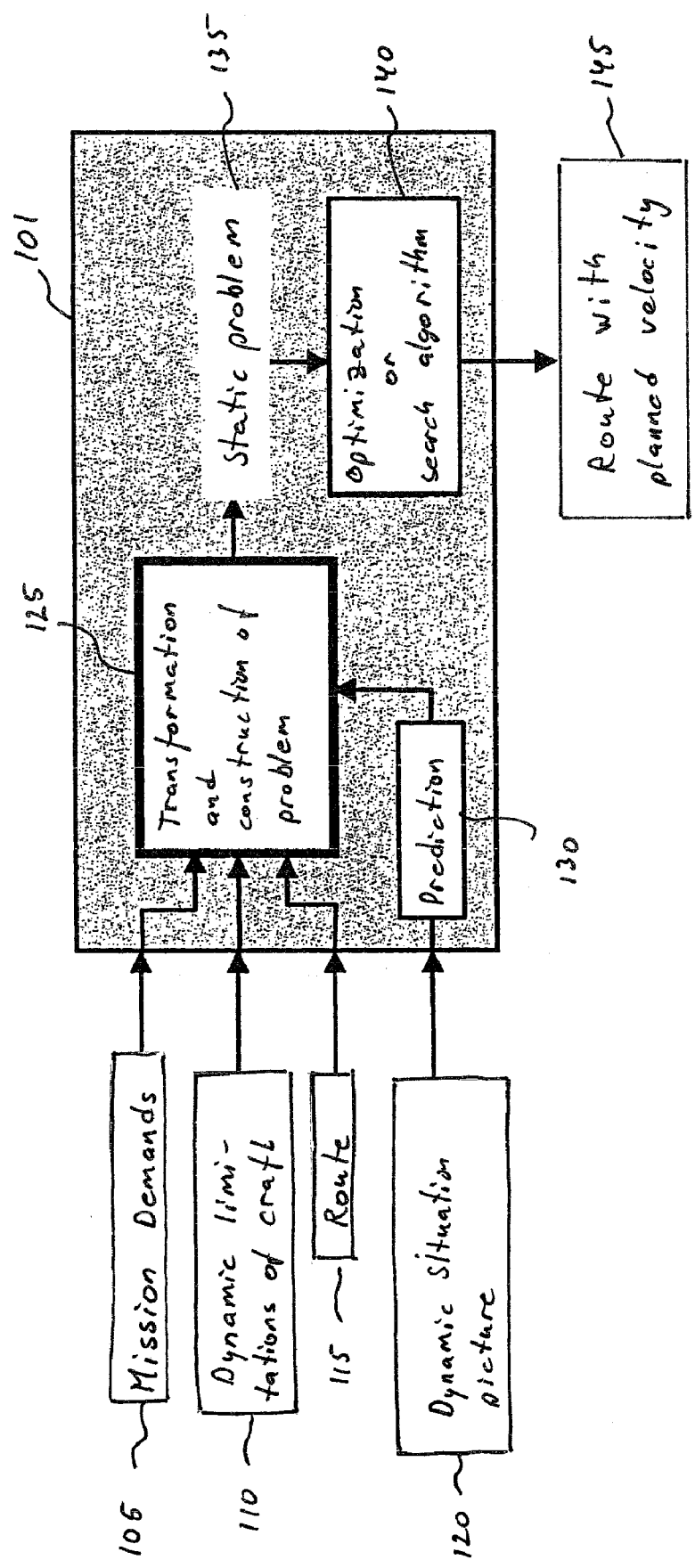
FIG. 1 shows, in the form of a pseudo-flowchart, an outline of a method for planning velocity along a route.

FIG. 1 shows, in the form of a pseudo-flowchart, an outline of a method for planning velocity along a route according to a first embodiment of the present invention. Data representative of mission demands 105, dynamic limitation of craft 100, route 115, and dynamic situation picture 120 are fed to a transformation and construction unit 125. The information regarding the dynamic situation picture 120 is fed via a prediction unit 130. The transformation and construction unit transforms the incoming data into the time-distance domain such that it fits into a time-distance space and/or a time-distance plot. The transformation and construction unit further sets up the problem, i.e. all limitations and restrictions, in the time-distance space and thus constructs a static problem 135. Said static problem 135 is then solved with the aid of an optimization and search unit 140. The output from said optimization and search unit 140 comprises a route, including planned velocity for the route.

Figure 2:
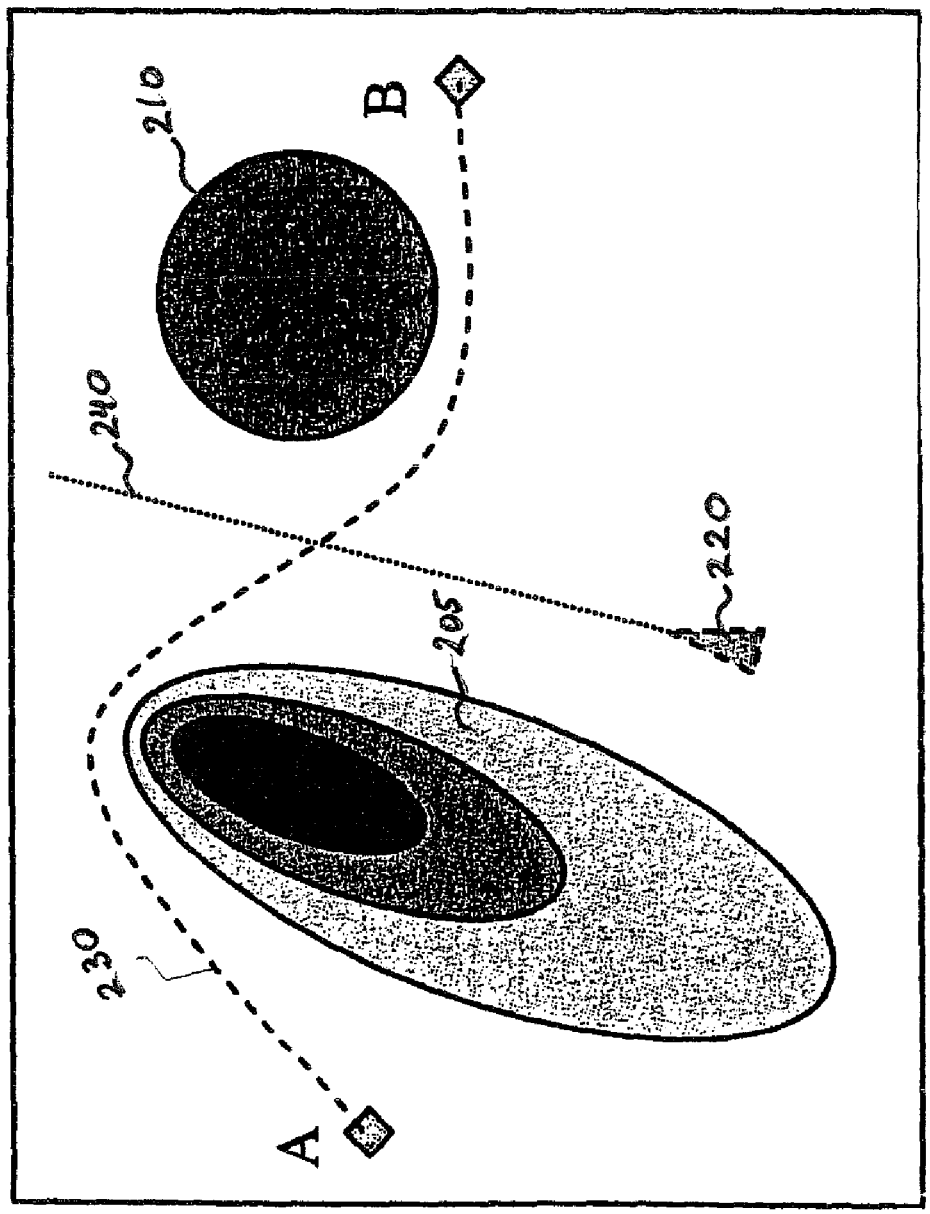
FIG. 2 shows an example of a velocity planning problem for a route between locations A and B in a map representation.

FIG. 2 shows an example of a route between locations A and B. In a first step, the route is planned with reference to the terrain and static threats. The aircraft having an intersecting course is not considered in this first step. Imagine that a route 230 has been planned between locations A and B. A terrain obstacle area 205 and a static threat are 210 represent areas restricting the route 230, i.e. the route 230 should not pass through said areas 205, 210. Now remains to determine the velocity V for the route 230, such that the craft arrives at location B at a specified point in time T. By studying a distance of the route 230, and the restriction placed by the required arriving time T, it is possible to plot the dynamic limitations of the craft and the boundary constraints of the route in a figure showing how far the craft can stay at the distance and still arrive at B at time T, see FIG. 3.

Figure 3:
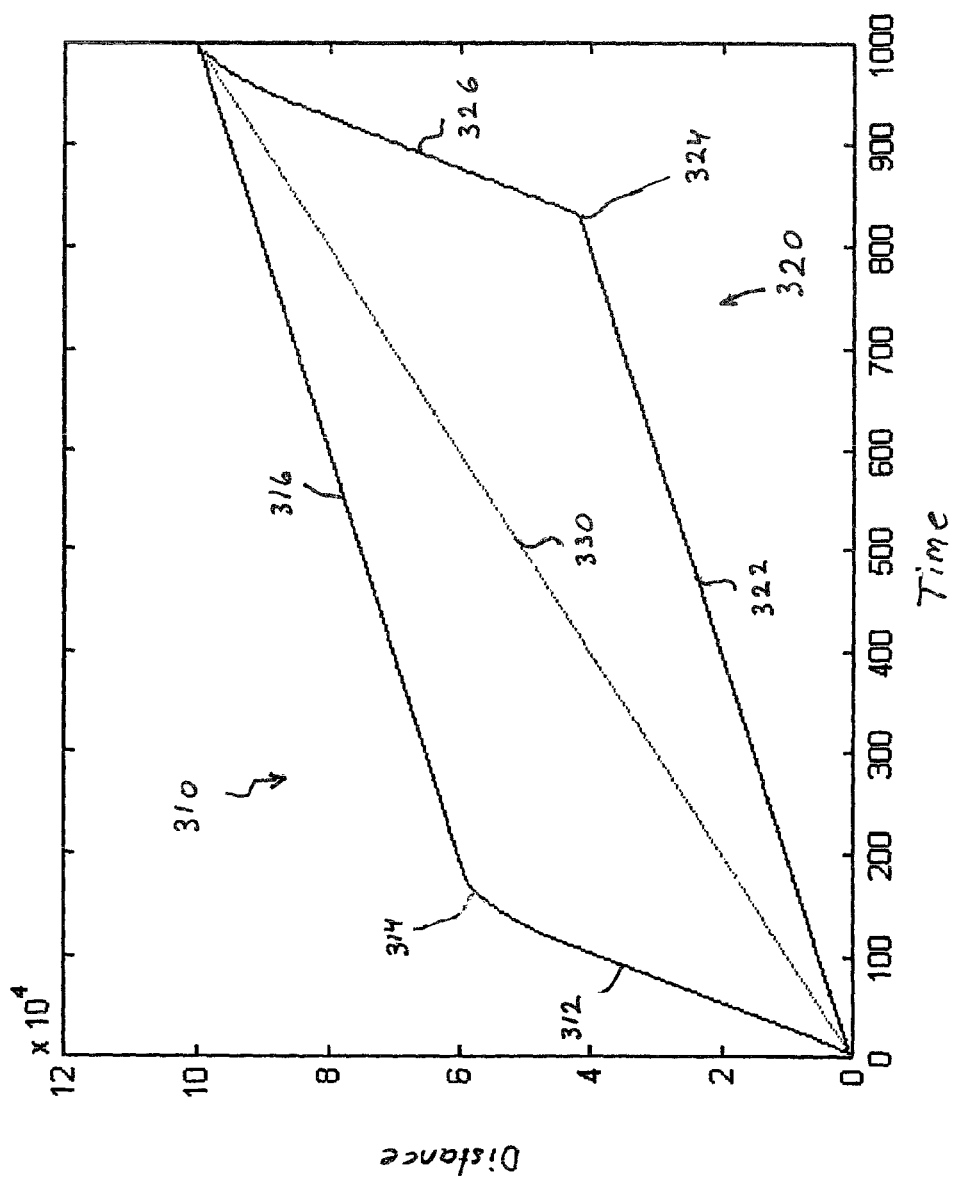
FIG. 3 shows a representation of the problem in FIG. 2 in the time-distance domain.

FIG. 3 shows a time-distance representation in a map representation in FIG. 2. The upper limitation line 310 corresponds to the possibility to begin the travel at highest possible velocity and subsequently change to a minimum velocity. The lower limitation line 320 corresponds to the opposite—to begin at a minimum velocity and subsequently change to a maximum velocity. Together, the two limitation lines 310, 320 create a distance envelope, describing which distances are possible to reach at a certain time and which comply with dynamic demands and constraints. The mean velocity D/T is described by the straight diagonal line 330. In the scenario there is also an aircraft 220, representing a dynamic threat on a course 240 intersecting the planned route 230. By predicting the position of the threat 220 forward in time, the point in time then the threat is coinciding with the route 230 at an intersecting point 410, see FIG. 4. In this example, this will happen in a point in time where t equals 550 seconds.

The dynamic threat is described in the distance envelope as a static curve, whose shape depends on the predicted position and uncertainty of the predicted position of the threat. A threat envelope is drawn that circumscribes the curve, corresponding to maximum and minimum velocities, which then describes the distance and time at which collision avoidance can not be guaranteed. The distance envelope, including the threat envelope, is described in FIG. 5.

Figure 4:
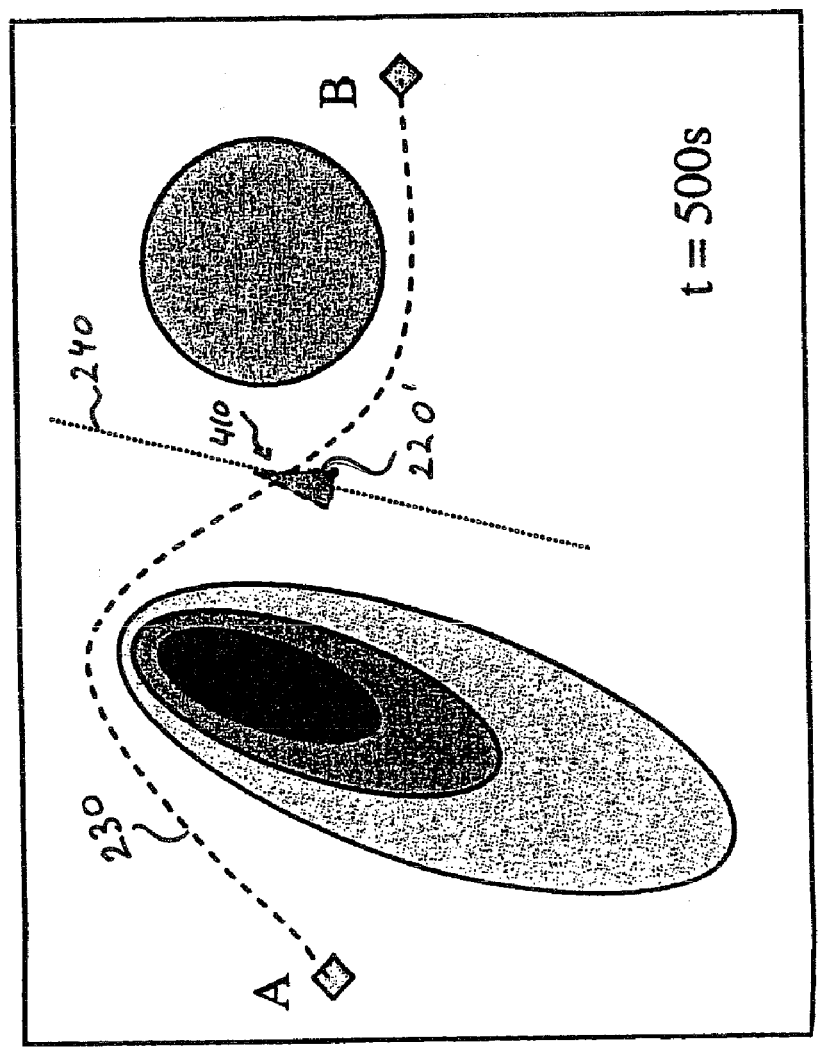
FIG. 4 shows a further aspect of the problem of FIG. 2.
Figure 5:
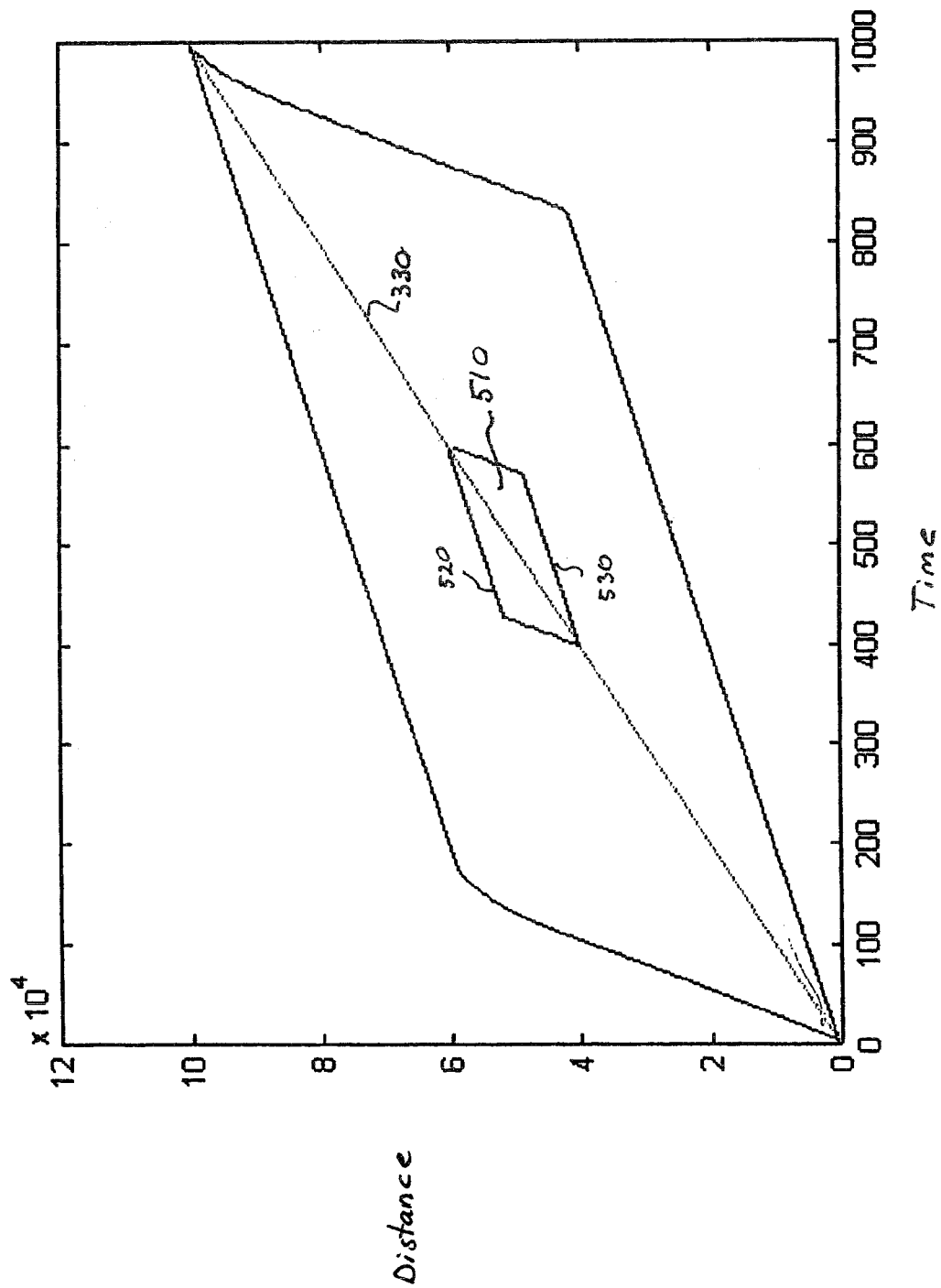
FIG. 5 shows the time-distance domain representation of the problem of FIG. 4.
Figure 6:
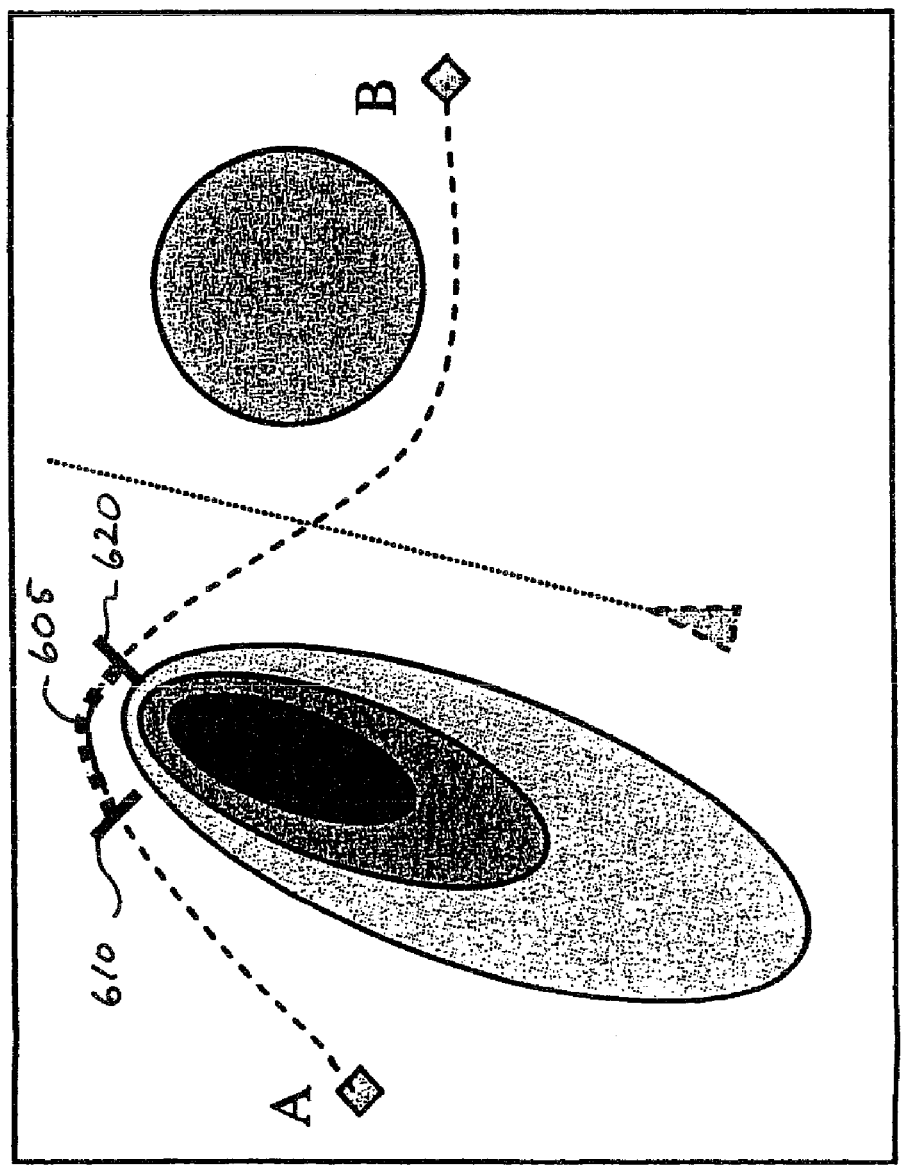
FIG. 6 shows a further aspect of the problem of FIG. 4.

FIG. 5 shows the static representation of the dynamic threat of FIG. 4. If the craft passes through the threat 510, there is a risk of collision, and this would be the case if mean velocity for the entire route, i.e. the diagonal line 330, has been selected. In the scenario it can also been seen, as depicted in FIG. 6, that a sharp turn 605 is present in the planned route. Such a turn entails that a restriction regarding maximum velocity has to be introduced along a portion 605 of the route. Because the maximum velocity was used to determine the distance envelope, said envelope must of course be revised.

Figure 7:
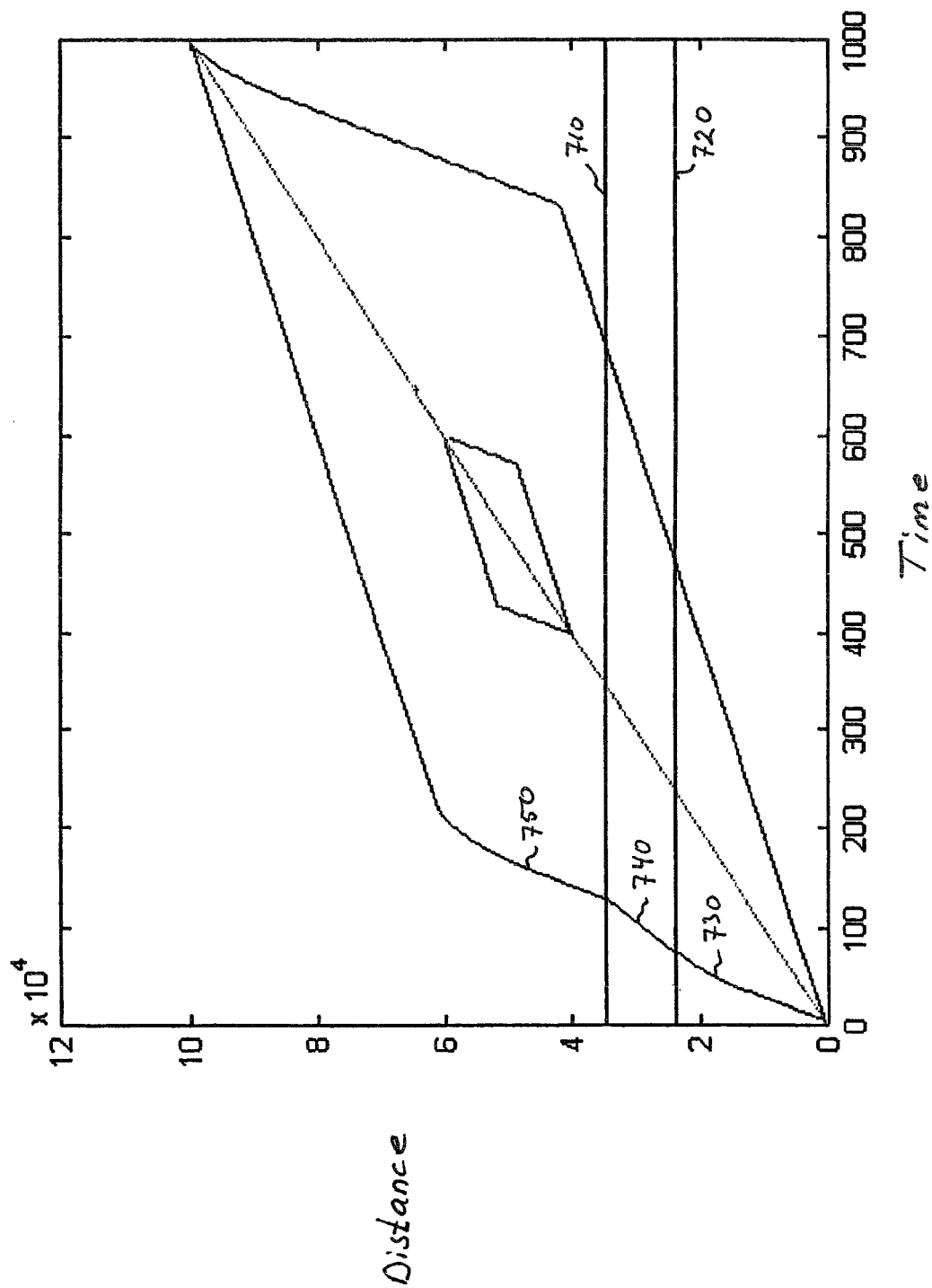
FIG. 7 shows the time-distance domain representation of the problem of FIG. 6.

In FIG. 7 the distance with reduced velocity is marked by two horizontal lines 710, 720, and the upper curve received a somewhat suppressed shape 730, 740, 750 compared to the original straight line representing maximum velocity 312. The limitation of this velocity is valid at all times, which also may influence the lower curve and threats existing within this area. By projecting the planned route against the time constraints of the mission and adding additional constraints due to craft performance, dynamic threats and limitations of the route regarding maximum velocity, a static description of the problem is created. Restrictions on the velocity can also arise if the flight altitude varies along the route.

Thus, the problem is now transformed into the time-distance domain.

Velocity Planning

The problem is now to find, in the time-distance domain, a path from start to finish that remains inside the envelope and that do not pass through the threat. This is the same problem that was to be solved in route planning, but with the difference that we here plan in other dimensions. Valid directions of search are limited by the velocity of the craft, the acceleration and limitations in maximum and minimum velocity at certain portions of the route.

It is also possible to utilise different tactics when the velocity is planned, e.g. to a) come as close to mean velocity as possible, or b) to fly with fuel economic velocity as long as possible, or c) to maximize freedom of manoeuvrability such that new upcoming threats can be avoided when the craft has traveled a part of the distance. The requested tactics can be added to the planning algorithm, such that the correct behaviour is obtained.

Figure 8:
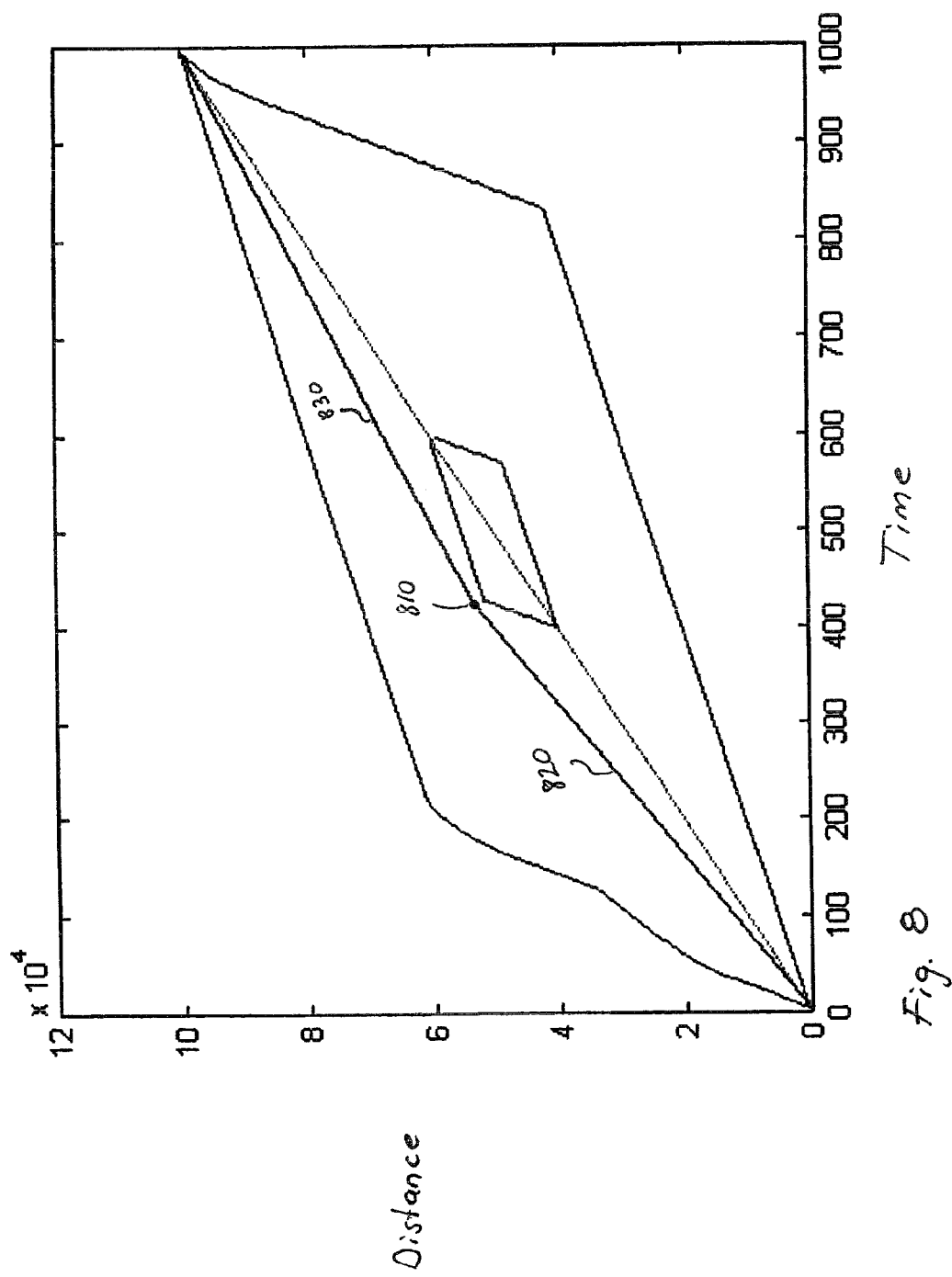
FIG. 8 shows a time-distance domain solution of the problem of FIG. 7.
Figure 10:
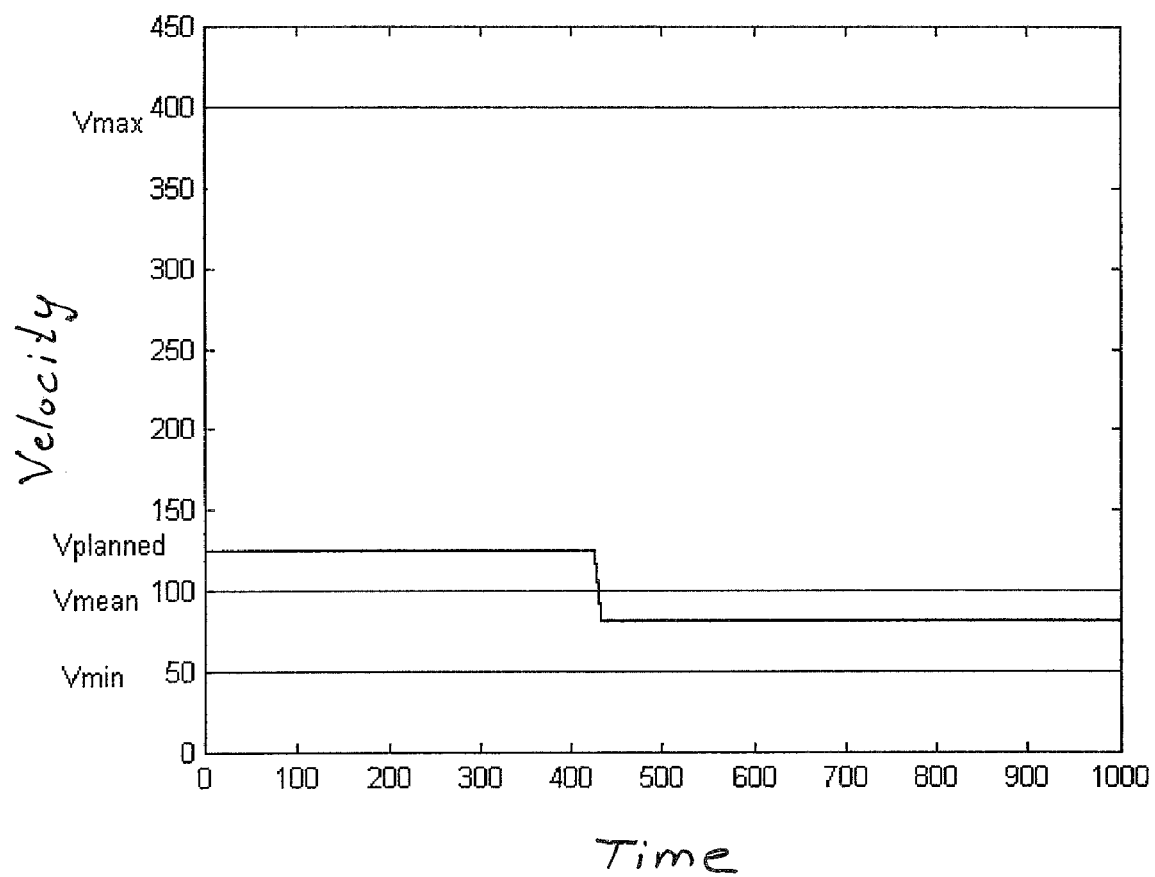
FIG. 10 shows a velocity profile of the problem of FIG. 8.

FIG. 8 shows the result when the velocity is planned along the route described above. In this particular case, the number of intermediate nodes (points with change in velocity) have been reduced to one. The planned velocity 820, 830 implies that a higher initial velocity is held, such that the route point of intersection with the threat is passed before the threat arrives. FIG. 10 shows the velocity profile as determined by the time derivative of the distance profile in FIG. 8.

Sequences of Distance Envelopes

A mission often comprises several legs, where each leg is terminated in a mission point having temporal restrictions. The restrictions vary, from the requirement that the craft must pass the point at a certain time, to the requirement that the craft must pass the point within a certain time window, to no time restrictions at all. By merging sequences of several distance envelopes for legs without tough time requirements, it is possible to perform a velocity planning for many legs simultaneously. The purpose of this is to see to the totality, and to create a so good pre-requisite as possible to be able to meet later time constraints present further on in the mission.

Figure 9:
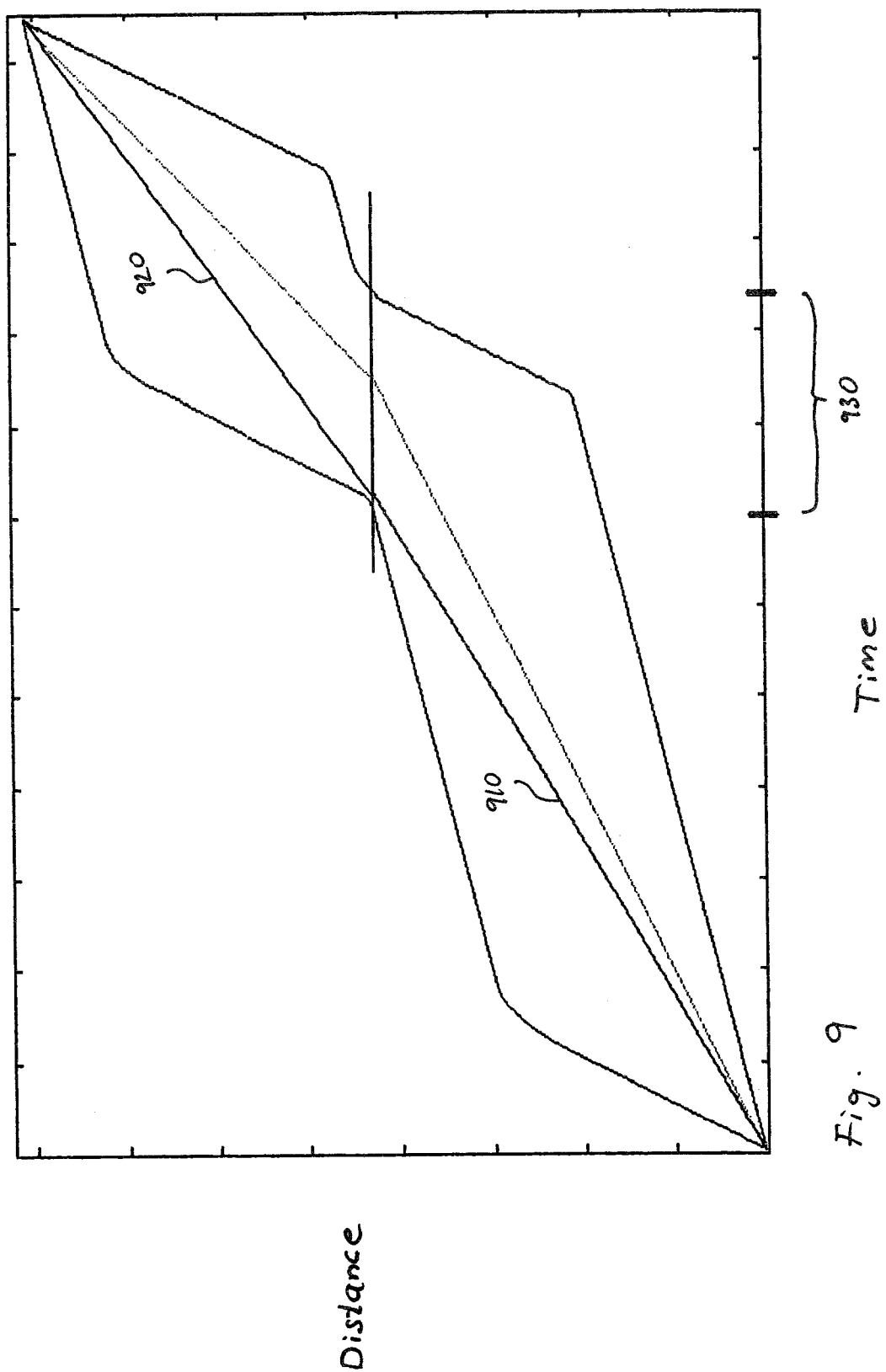
FIG. 9 shows a time-distance domain solution of a multiple leg problem.

FIG. 9 describes two distance envelopes from two adjacent legs in the example mission. The first leg 910 has a time window 930 as a restraint in the finish point, and the second leg 920 has a fixed time constraint, i.e. a specific time to meet. By utilising the time window 930, a more uniform velocity can be planned than would be the case if two mean velocities along the distances were used. Also in this case it is possible to utilise different tactics to optimise the choice of velocity along the route. As an example it can be mentioned that something could happen along the route, requiring the route to be replanned. This will almost certainly result in a longer route than the original one, why it can be practical to initially keep a higher speed to gain ground as soon as possible.

In another embodiment of the present invention, said method for planning the velocity of a craft along a predetermined route comprises the following steps:

Obtaining data representative of mission demands, including mission time constraints such as required time of departure (RTD) and a required time of arrival (RTA) and possible associated time windows.

Obtaining data representative of dynamic limitations of the craft, including
a maximal velocity (VMAX),
a minimal velocity (VMIN),
a maximal velocity during sharp turns,
said data may also include
a maximal cruising velocity, and
a minimal cruising velocity.

Obtaining data representative of a predetermined route, including
a starting point, and
an arrival point,
said data may also include
a number of waypoints and/or a number of arc segments describing the route.

Obtaining data representative of a dynamic situation picture, including
estimates of positions of threat crafts,
uncertainties of positions of threat crafts,
estimates of velocities for said threat crafts,
uncertainties of velocities for said threat crafts,
timestamps of said positions for threat crafts.

Transforming said mission demand data, dynamic limitation data, route data and dynamic situation data into the time-distance domain.

Creating a distance envelope in said time-distance domain.

Determining a distance profile in the time-distance domain which stays within the distance envelope.

Determining a velocity profile from the time derivative of the distance profile.

Advantages

The above described method solves the problem of velocity planning in a general way. Regardless of the existence of dynamic crafts or threats intersecting the route, or if there are velocity limitations along the distance, the velocity is planned in consideration of mission requirements and the dynamic limitations of the craft.

The strength of the method is that the planning is performed in a time dependent "map", which makes all dynamic aspects static during the planning itself, Therefore, it is possible to use conventional algorithms for route planning to solve the problem.

The method can be used as a component in vehicle planning, navigation or control devices (on board or off board) to determine velocities along a route, for example in UAV control stations, aircraft flight management systems, air traffic control stations, ship navigation systems etc. The method is equally usable for all types of vehicles and crafts (ground, water and air).

The scope of the invention is only limited by the claims below.

The invention claimed is:

1. A method implemented in a computer system for planning the velocity of a craft along a predetermined route, the method comprising:
   obtaining data representative of mission demands via processor;
   obtaining data representative of dynamic limitations of the craft;
   obtaining data representative of a predetermined route;
   obtaining data representative of a dynamic situation picture;
   transforming said mission demand data, dynamic limitation data, route data and dynamic situation data into a time-distance domain, wherein the dynamic situation data comprises data on objects intersecting the predetermined route;
   creating a distance envelope in said time-distance domain;
   determining a distance profile in the time-distance domain which stays within the distance envelope;
   determining a velocity profile from a time derivative of the distance profile, wherein determining the velocity profile comprises creating a time-distance curve that avoids the objects intersecting the predetermined route; and
   directing the craft along the predetermined route according to the velocity profile,
   wherein creating a distance envelope comprises creating of an upper limitation curve in the time-distance domain, and creating of a lower limitation curve in the time-distance domain,
   wherein creating an upper limitation curve comprises creating a time-distance curve corresponding to a case where the craft initially travels at maximum speed and switches to minimum speed at a latest moment to arrive at a finish point at an earliest permitted arrival time, and
   wherein creating a lower limitation curve comprises creating a time-distance curve corresponding to a case where the craft initially travels at a minimum speed and at a latest moment switches to a maximum speed to arrive at a finish point at a latest permitted arrival time.

2. The method according to claim 1, wherein the data on objects intersecting the predetermined route, includes course and estimated velocity and velocity variations and velocity uncertainty.

3. The method according to claim 1, further comprising: creating a threat envelope.

4. The method according to claim 3, wherein said determining a velocity profile comprises creating a time-distance curve representative of said velocity profile and that does not cross an area defined by the threat envelope.

5. The method according to claim 4, wherein said threat envelope is created by creating an upper and a lower limitation curve for a threat object.

6. The method according to claim 1, further comprising:
obtaining data representative of mission demands, including mission time constraints;
obtaining data representative of dynamic limitations of the craft, including a maximal velocity, a minimal velocity, and a maximal velocity during sharp turns;
obtaining data representative of a predetermined route, including a starting point, and an arrival point;
obtaining data representative of a dynamic situation picture, including estimates of positions of threat crafts, uncertainties of positions of threat crafts, estimates of velocities for said threat crafts, uncertainties of velocities for said threat crafts, and timestamps of said positions for threat crafts;
transforming said mission demand data, dynamic limitation data, route data and dynamic situation data into the time-distance domain;
creating a distance envelope in said time-distance domain;
determining a distance profile in the time-distance domain which stays within the distance envelope; and
determining a velocity profile from the time derivative of the distance profile.

7. The method according to claim 6, wherein the mission time constraints comprise a required time of departure and a required time of arrival and possible associated time windows.

8. The method according to claim 6, wherein said data representative of dynamic limitations of the craft also includes a maximal cruising velocity and a minimal cruising velocity.

9. The method of claim 7, wherein said data representative of a predetermined route also includes a number of waypoints describing the route.

10. A system for planning the velocity of a craft along a predetermined route according to the method of claim 1.

11. A computer software product executable on a data processing device, comprising:
computer program instructions for implementing in a computer system a method for planning the velocity of a craft along a predetermined route, the method comprising:
obtaining data representative of mission demands;
obtaining data representative of dynamic limitations of the craft;
obtaining data representative of a predetermined route;
obtaining data representative of a dynamic situation picture;
transforming said mission demand data, dynamic limitation data, route data and dynamic situation data into a time-distance domain, wherein the dynamic situation data comprises data on objects intersecting the predetermined route;
creating a distance envelope in said time-distance domain;
determining a distance profile in the time-distance domain which stays within the distance envelope;
determining a velocity profile from a time derivative of the distance profile, wherein determining the velocity profile comprises creating a time-distance curve that avoids the objects intersecting the predetermined route; and
directing the craft along the predetermined route according to the velocity profile,
wherein creating a distance envelope comprises creating of an upper limitation curve in the time-distance domain, and creating of a lower limitation curve in the time-distance domain,
wherein creating an upper limitation curve comprises creating a time-distance curve corresponding to a case where the craft initially travels at maximum speed and switches to minimum speed at a latest moment to arrive at a finish point at an earliest permitted arrival time, and
wherein creating a lower limitation curve comprises creating a time-distance curve corresponding to a case where the craft initially travels at a minimum speed and at a latest moment switches to a maximum speed to arrive at a finish point at a latest permitted arrival time.

* * * * *